United States Patent
Novak et al.

(10) Patent No.: US 9,268,492 B2
(45) Date of Patent: *Feb. 23, 2016

(54) NETWORK BASED MANAGEMENT OF PROTECTED DATA SETS

(71) Applicant: Microsoft Corporation, Redmond, WA (US)

(72) Inventors: Mark F. Novak, Newcastle, WA (US); Andrew John Layman, Bellevue, WA (US); Magnus Nyström, Sammamish, WA (US); Stefan Thom, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/311,582

(22) Filed: Jun. 23, 2014

(65) Prior Publication Data

US 2014/0304506 A1    Oct. 9, 2014

Related U.S. Application Data

(63) Continuation of application No. 13/527,439, filed on Jun. 19, 2012, now Pat. No. 8,782,423.

(51) Int. Cl.
*G06F 21/57* (2013.01)
*G06F 3/06* (2006.01)
*G06F 21/60* (2013.01)

(52) U.S. Cl.
CPC .............. *G06F 3/0622* (2013.01); *G06F 21/57* (2013.01); *G06F 21/602* (2013.01)

(58) Field of Classification Search
CPC ....................................................... G06F 21/57
USPC ............................................................ 713/162
See application file for complete search history.

(56) References Cited

U.S. PATENT DOCUMENTS 8,782,423 B2 *   7/2014   Novak et al. .................. 713/176
(Continued)

FOREIGN PATENT DOCUMENTS

WO        2012/093924 A1      7/2012

OTHER PUBLICATIONS

"International Search Report & Written Opinion for PCT Patent Application No. PCT/US2013/045725", Mailed Date: Oct. 29, 2013, Filed Date: Jun. 13, 2013, 13 Pages.

(Continued)

*Primary Examiner* — Jacob Lipman
(74) *Attorney, Agent, or Firm* — Henry Gabryjelski; Sade Fashokun; Micky Minhas

(57) ABSTRACT

A system that includes an account management module configured to maintain protected accounts. For instance, a particular protected account includes a protected data set that is not readable outside of the system, and perhaps not even readable outside of the account. The particular data set corresponds to a particular entity assigned to the particular account and that includes keys corresponding to the particular entity. A security processor uses at least some of the plurality of keys to perform cryptographic processes in response to one or more trusted execution environment commands received from the particular entity.

22 Claims, 4 Drawing Sheets

(56) References Cited

U.S. PATENT DOCUMENTS

| | | |
|---|---|---|
| 2007/0300069 A1 | 12/2007 | Rozas |
| 2008/0046898 A1 | 2/2008 | Molina et al. |
| 2009/0320110 A1 | 12/2009 | Nicolson et al. |
| 2011/0270763 A1 | 11/2011 | Graham et al. |
| 2011/0302425 A1 | 12/2011 | Saripalli |

OTHER PUBLICATIONS

Office Action cited in U.S. Appl. No. 13/527,439, mailed Nov. 12, 2013.

Notice of Allowance cited in U.S. Appl. No. 13/527,439, mailed Mar. 7, 2014.

* cited by examiner

NETWORK BASED MANAGEMENT OF PROTECTED DATA SETS

CROSS-REFERENCE TO RELATED APPLICATIONS

This application is a continuation of U.S. patent application Ser. No. 13/527,439, filed Jun. 19, 2012, entitled "NETWORK BASED MANAGEMENT OF PROTECTED DATA SETS," which issued as U.S. Pat. No. 8,782,423 on Jul. 15, 2014, and which application is expressly incorporated herein by reference in its entirety.

BACKGROUND

Trusted Platform Modules (or "TPMs") are trusted execution environments that are isolated from the regular operating environment of computing devices. Typically, TPMs are implemented in the form of a chip that is physically bound to a computing device. The regular computing environment may communicate with the TPM through an interface, an example of which being TPM Based Services (or "TBS").

TPMs provide a range of functions, most commonly used of which are cryptographic key generation, policy-driven key use, sealed storage, and attestation. TPMs have a region of memory called a "protected area" that contains data that cannot be read, but nevertheless operations may be performed using and/or on such data. Some of the data is immutable and thus is read (but not changed) by the operation that is being performed, and some of the data is mutable and can be changed through such operations. Note that it is the operation that is being performed internal to the TPM that is reading the data. The protected data is not readable outside the TPM.

Thus, the TPM has an operational component that performs operations, and a memory component which retains protected data that cannot be read outside of the TPM. The operational speed of the TPM is limited to the capabilities of the hardware within the TPM. Also, the size of the protected area is limited to the space within the TPM.

BRIEF SUMMARY

At least one embodiment described herein relates to a system that includes an account management module configured to maintain protected accounts. For instance, a particular protected account includes a protected data set that is not accessible from outside of the system, and perhaps not even accessible from outside of the account. The particular data set corresponds to a particular entity (e.g., a device, system, user, component, or combination thereof) assigned to the particular account and includes keys corresponding to the particular device. A security processor uses at least some of the keys to perform cryptographic and security processes in response to one or more trusted execution environment commands received from the particular entity. In some embodiments, there may be multiple data sets for different entities belonging to the same account.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

Figure 1:
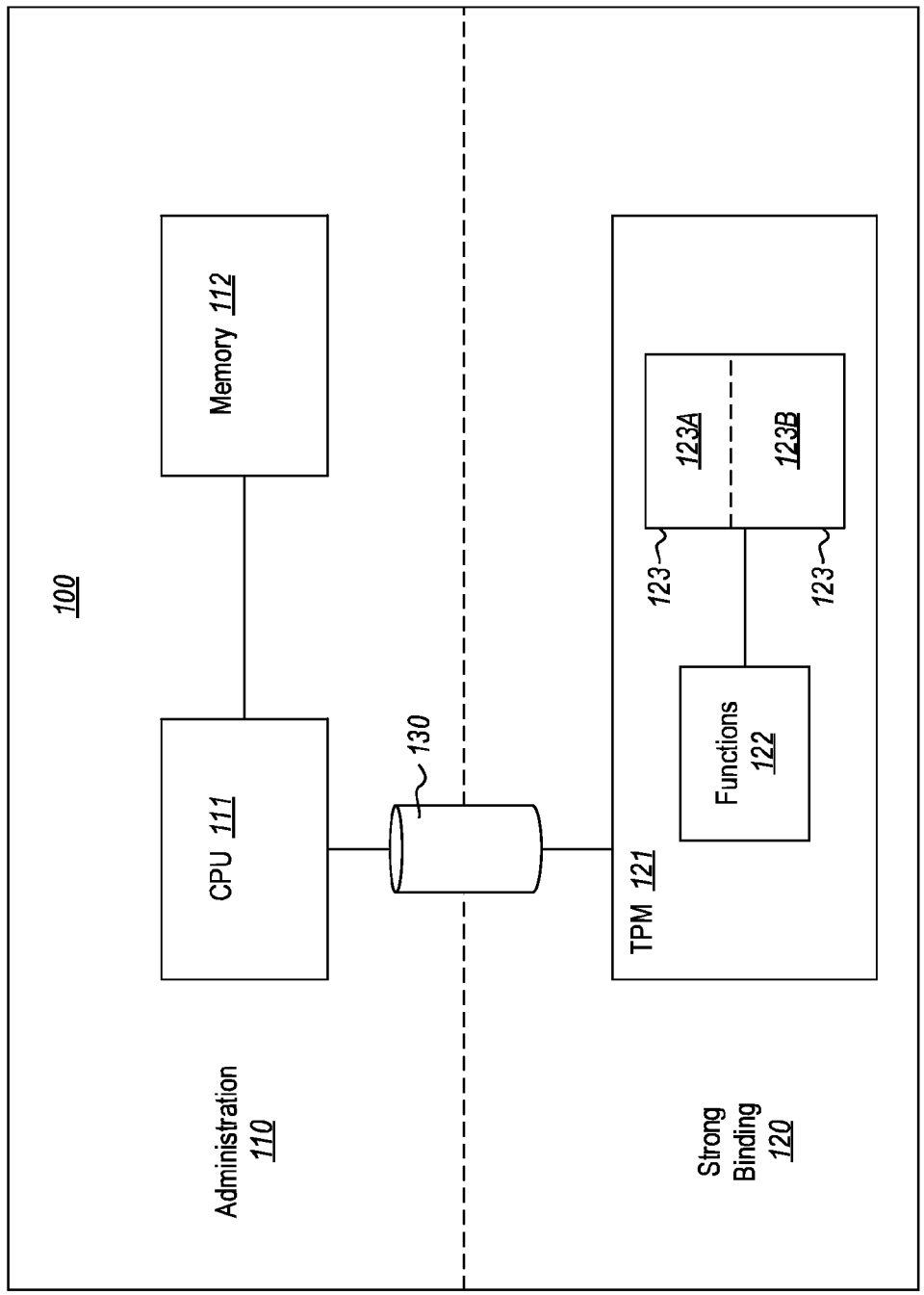
FIG. 1 illustrates an example computing system that may be used to employ embodiments described herein and which includes an administration level and a local trusted execution environment level.

In accordance with at least one embodiment described herein, a system is described in which an account management module maintains protected accounts. For instance, a particular protected account includes a protected data set that is not accessible from outside of the system, and perhaps not even accessible from outside of the account. The particular data set corresponds to a particular entity (e.g., a device, system (such as a computing system), user, component, or combination thereof) assigned to the particular account and includes keys corresponding to the particular entity. A security processor uses at least some of the plurality of keys to perform cryptographic and security processes in response to one or more trusted execution environment commands received from the particular entity. In some embodiments, there may be multiple data sets, each corresponding to a different entity. Furthermore, although not required, there may be multiple protected data sets within a single account.

Computing systems are now increasingly taking a wide variety of forms. Computing systems may, for example, be handheld devices (such as smart phones), appliances, laptop computers, desktop computers, mainframes, distributed computing systems, or even devices that have not conventionally been considered a computing system (such as wrist watches, kitchen appliances, automobiles, medical implants, and so forth). In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system.

As used herein, the term "module" or "component" can refer to software objects or routines that execute on the computing system. The different components, modules, engines, and services described herein may be implemented as objects or processes that execute on the computing system (e.g., as separate threads).

Embodiments described herein may comprise or utilize a special purpose or general-purpose computer including computer hardware, such as, for example, one or more processors and system memory, as discussed in greater detail below.

Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions or data are physical storage media. Computer-readable media that carry computer-executable instructions or data are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like.

In this description and in the claims, a "device" is defined as any computing system that is not distributed. However, the invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example of a computing system 100. The computing system 100 includes an administration domain 110 (or "administration level") and a local trusted execution environment domain 120 (or "local trusted execution environment level"). The administration domain 110 includes a processor 111 and a main memory 112. The main memory 112 is accessible to an administrator of the computing system 100 via the use of processor 111. The main memory 112 may be physical system memory, which may be volatile, non-volatile, or some combination of the two. The term "memory" may also be used herein to refer to non-volatile mass storage such as physical storage media.

The local trusted execution environment domain 120 cannot be accessed directly even by a human administrator. The local trusted execution environment domain 120 includes a Trusted Platform Module (TPM) 121 that includes cryptographic functions 122 and protected area 123. If there were any possible way to directly access the content of the TPM, that method would involve actually physically slicing or otherwise breaking apart the TPM and using complex equipment to physically examine the contents. Thus, the contents of the local trusted execution environment domain 120 are secure. The protected area 123 includes at least some content that is unreadable outside of the TPM. The cryptographic functions 122 can, however, operate using the content of the protected area 123. The protected area includes immutable data 123A and mutable data 123B. Both types of data can be read by the cryptographic functions 122. However, only the mutable data 123B can be written to by the cryptographic functions 122.

An example of immutable data is an endorsement key, which acts as a passport for the TPM, providing manufacturer-level security in the identity of the TPM. Furthermore, since conventional TPMs are physically attached to the computing system, the endorsement key also securely identifies the computing system 100, and thus may serve as a trust foundation for the computing system 100.

Examples of mutable data include other keys, monotonic counters, and non-volatile memory. The other keys may be constructed on the request of the processor 111. A monotonic counter begins at zero, and is incremented when requested by the processor 111, or in response to certain events (such as powering on the system). Keys may be migratable or non-migratable. Migratable keys may be used in any TPM with proper authorization, whereas non-migratable keys may only be used in the TPM 121.

The computing system 100 includes an interface 130 for communicating between the processor 111 to the TPM 121. An example of a conventional interface 130 is a TPM Based Services module (TBS) that provides TPM commands from the processor 111 to the TPM 121, and if appropriate, provides results of the cryptographic processing (but of course not the content of the TPM 121) back to the processor 111.

This conventional computing system 100 with the conventionally deployed TPM described with respect to FIG. 1, has certain advantages and disadvantages. For instance, conventional TPMs are rather inexpensive to manufacture, and do provide a protected area at the local trusted execution environment level. However, the cryptographic functions of the TPM are often quite slow since the processing is limited to the capability of a small TPM. Furthermore, the memory space of the protected area 122 is also often quite small, often well below one megabyte. Furthermore, if the computing system 100 or the TPM 121 is damaged, all keys that were bound to the TPM, or constructed by the TPM, become unusable. Furthermore, conventional computing systems can take advantage of TPM functionality only by being physically tied to the TPM.

Although conventional computing systems that contain TPMs are not distributed, the term "computing system" as used herein may also be distributed over network environment, in which case, the processing, memory and/or storage capability may be distributed as well.

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory of the computing system.

Figure 2:
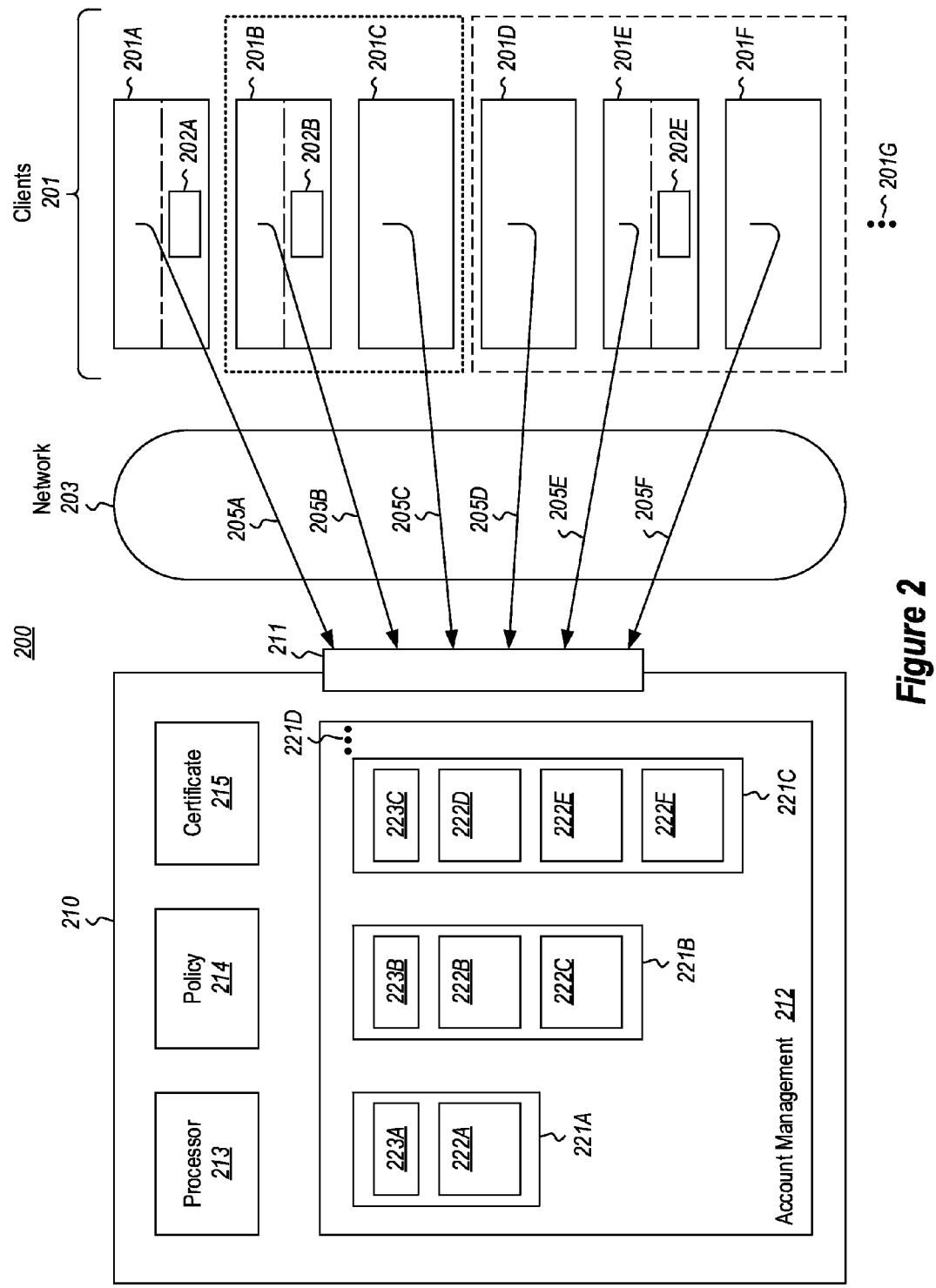
FIG. 2 illustrates an environment in which multiple clients, some of which utilize a Trusted Platform Module (TPM) interface with a system over a network, the system includes multiple accounts, each having one or more protected data sets that are subject to cryptographic processes implemented in response to local trusted execution environment commands received from the clients.

FIG. 2 illustrates an environment 200 in which the principles described herein may be employed. Specifically, the environment 200 includes multiple client computing systems 201 (hereinafter referred to as "clients 201"). The principles described herein allow at least some local trusted execution environment functionality to be offloaded from the clients over a network 203 into the system 210. This is counterintuitive as traditionally TPM modules operate at the local trusted execution environment level, and thus are physically tied to the client. In the case of FIG. 2, multiple clients are able to offload TPM functionality to the system 210. An example of the network 203 is the Internet, although the principles described herein may also be applied to other networks, such as perhaps an enterprise network.

The functionality of the TPM is offloaded by having the system 210 emulating the protected area and its non-readability feature. For instance, whereas a traditional TPM has a protected area that includes data that cannot be read outside of the TPM, the system 210 has a protected area for each entity, and the protected area is not readable from outside of the system, or from outside of the account, except by the a security processor 213. Since the system 210 is not easily breached to thereby allow another entity to read the protected data, the system 210 provides an equivalent of local trusted execution environment security in creating a significant barrier to discovery of the content of the protected area.

Furthermore, a security processor 213 may respond to the trusted execution environment commands in the same manner that a local TPM would normally respond to such trusted execution environment commands. For instance the security processor 213 may perform cryptographic and/or security processing on keys and/or protected data sets. This allows much of the functionality of the TPM to be emulated. If a client is destroyed, the TPM is still available in the system 210, and thus keys and other data (such as monotonic counters, non-volatile RAM contents, and so forth, associated with the TPM) that were generated from the TPM may still be used.

In FIG. 2, there are six clients 201A through 201F illustrated. However, the ellipses 201G represents that the principles described herein are not limited to the particular number of clients 201 connected to the system 210. There may be as few as one, but potentially many, especially if the network 203 is the Internet and/or the system 210 is a cloud computing environment. Furthermore, the number of clients 201 may change over time. For instance, if the system 210 were a cloud computing environment, the number of clients 201 could vary by the second or minute.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Some of the clients 201 might include a TPM, and some might not. For instance, in the case of FIG. 2, client 201A has TPM 202A, client 201B has TPM 202B, and client 201E has client 202E. Others of the clients including clients 201C, 201D or 201F do not have a TPM. The presence of a TPM allows some machine specific functionality of the TPM to be offloaded (such as the ability to provide a trusted event history associated with the machine) as will be explained below, even though the local client TPM might not be fully performing as a TPM. However, even without a TPM, some of the TPM functionality may still be offloaded as described below.

A system 210 includes a reception module 211 that receives trusted execution environment commands issued by the clients 201. The trusted execution environment commands that would normally be issued to a TPM using a TPM software interface (such as TBS) are instead intercepted, and dispatched to the system 210 to thereby be received by the reception module 211. For instance, clients 201A through 201F dispatch such trusted execution environment commands as represented by corresponding arrows 205A through 205F. Each trusted execution environment command is a command to operate on a security context (e.g., a key or data) that corresponds to a entity that issued the command. The system includes a security processor 213 that performs cryptographic and security functions in response to the trusted execution environment commands received by the reception module 211.

The system 210 also includes an account management module 212 that includes multiple protected accounts 221. In FIG. 2, the accounts includes three accounts 221A, 221B and 221C, although the ellipses 221D represents that there may be any number of accounts managed by the system 210. Each account corresponds to one or more of the clients 201 and includes a protected data set corresponding to each client. Each protected data set emulates what a protected area of a TPM would look like for each client. However, since the protected data set is not limited to the small area of the TPM, the protected data set may be much larger, perhaps in the megabyte, gigabyte, of terabyte ranges.

In FIG. 2, the account 221A has a protected data set 222A that corresponds to the client 201A. The account 221B has a protected data set 222B that corresponds to the client 201B, and a protected data set 222C that corresponds to the client 201C. The respective clients for the account 221B are encompassed by a dotted-lined box. The account 221C has a protected data set 222D that corresponds to the client 201D, a protected data set 222E that corresponds to the client 201E, and a protected data set 222F that corresponds to the client 201F. The respective clients for the account 221C are encompassed by a dashed-lined box.

The protected data sets 222 are "protected" in the sense that their contents are not readable outside of the context of the system, and perhaps not readable outside of the corresponding account, except perhaps by the security processor 213. In one embodiment, an instance of the security processor 213 is run inside of the context of the account. In that case, there would be a security processor 213 inside the account 221A, another security processor 213 inside the account 221B, and another security processor 213 inside the account 221C.

Figure 3:
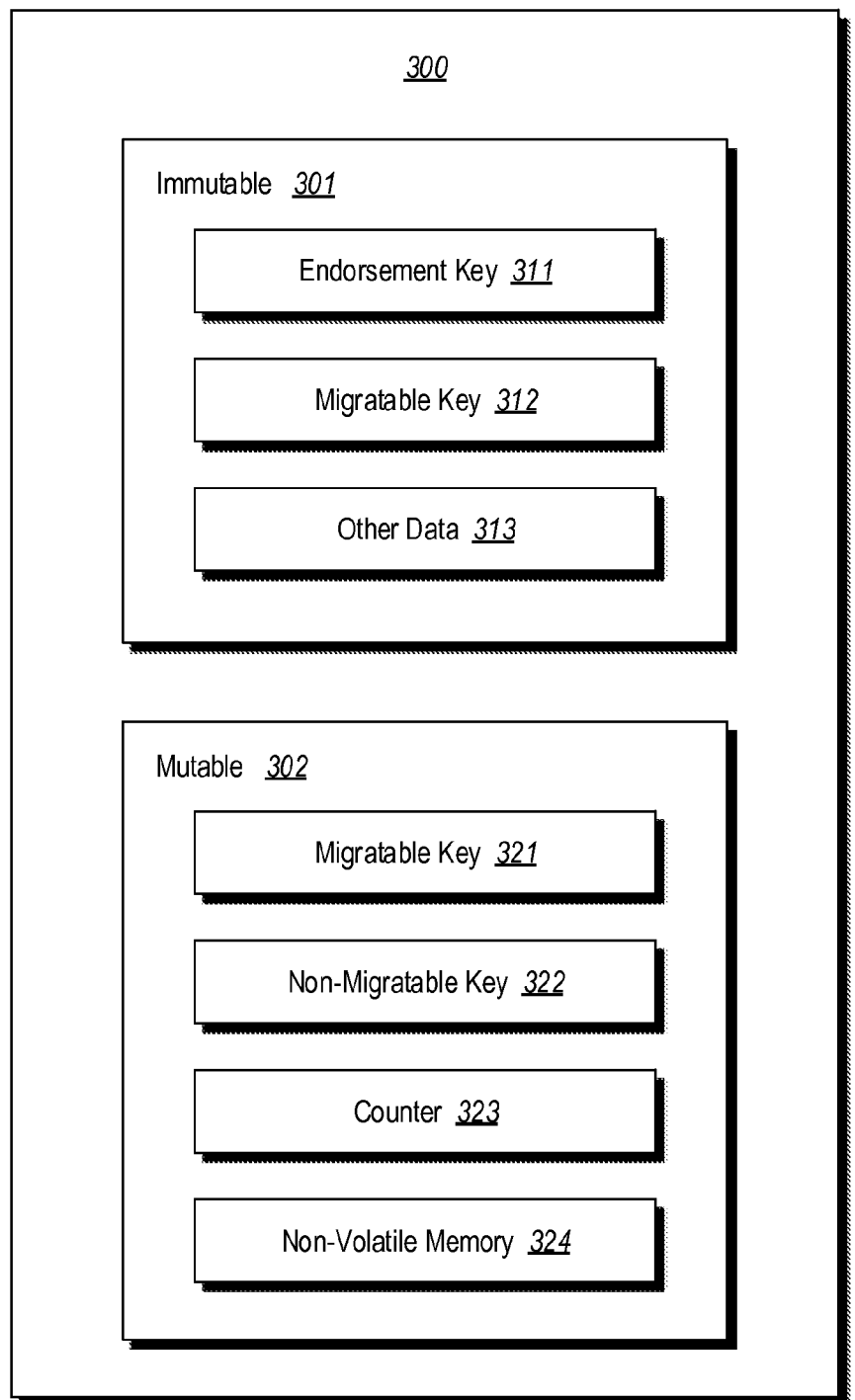
FIG. 3 abstractly illustrates protected data set as including immutable data and mutable data.

Each data set emulates an example of what the corresponding client 201 might have in its TPM if there were no memory restrictions to that TPM. For instance, FIG. 3 illustrates a particular data set 300 that includes immutable data 301 and mutable data 302. For instance, immutable data 301 includes an endorsement key 311, which is non-migratable. The immutable data 301 also includes a migratable key 312, and other immutable data 313. The mutable data 302 includes a migratable key 321, a non-migratable key 322, a monotonic counter 323, and non-volatile memory 324.

All of the data set 300 is protected as mentioned above. However, immutable data 301 cannot be changed, even by the security processor 213. Mutable data 302 can be changed, but only in response to execution of the security processor 213. An endorsement key 311 is a non-migratable key in that it can only be used inside the account corresponding to the data set. However, the migratable key 312 can be used outside of the account, but only under protected circumstances (such as in another TPM or another similarly configured account) that prevents reading the migratable key in the clear. The immutable data 301 also may include other data 313. The mutable data 302 may also have migratable and non-migratable keys such as migratable key 321 and non-migratable key 322. The mutable data 302 also includes a monotonic counter that irreversibly increments in response to a request to increment, and/or in response to another event (such as a powering up of the machine). The mutable data 302 also may include non-volatile memory.

Optionally, each protected account 221A through 221C may further include a corresponding account-level data set 223A through 223C. For instance, account 221A has account-level data set 223A, account 221B has account-level data set 223B, and account 221C has account-level data set 223C. Each account-level data set is not specific to any of the entities associated with the account, but is general to the account itself. As an example, using existing TPM communication protocols, upper level PCRs (such as PCR 24 and above) may be used for such account-level data.

As an example, suppose the account 221B corresponds to a particular user, the account-level data set 223B might list user passwords. The account-level data set 223B might also be used to record immutable events associated with the account. For instance, the account-level data set 223B might store a record of high-sensitivity functions (such as account and session management) in the operating system. This would make it difficult to elevate privileges or hijack and account. Furthermore, being able to tie an account to other trusted platform module (TPM) properties, like PCRs for example, allows implicit attestation of the system for a user to be successfully authenticated and operational. As another example, the user might store a sequence of licenses that the user has signed up for. Again, this sequence could be immutable, and perhaps made using a single entry from which the sequence of licenses can be mathematically derived. In that case, if the question ever came up as to whether the user had a license to a particular product, the user may concretely know the answer.

Accordingly, what is described is an effective way to off-load guaranteed immutability of a content of a protected area from a local TPM to a service over a network, such as in a cloud computing environment. This is accomplished by intercepting trusted execution environment commands that are issued from a client processor to a TPM, and redirecting them over a network to a system that has a security processor that is capable of interpreting the trusted execution environment commands, and a data set for each client the includes data that is to be protected.

This preserves the security of a local trusted execution environment layer since the protected area (e.g., the data set) would be extremely difficult or impossible to breach, essentially requiring a breach of the system 210 in order to access the protected data. Since the system 210 might be quite sophisticated and have high levels of security, breaching of the system 210 would be extremely difficult or impossible. Such difficulty or impossibility might even exceed that of attempting to breach a client TPM on the client machine itself. Accordingly, local trusted execution environment security is preserved. Although information may be communicated from the client to the system, 210, such information is only the trusted execution environment commands, not the actual data being protected in the data set. Accordingly, even if someone could read such traffic, the protected data remains protected. In some embodiment, even the network traffic may be encrypted if a trust relationship exists between the client processor and the system 210. Such might be helpful in the case of there being security issues associated with transmitting commands in the clear. Such a trust relationship could be, for example, bootstrapped at the time the client is provisioned.

As an additional benefit, since the memory space is no longer limited to a small chip, the amount of available memory may be significantly increased. Furthermore, since processing power is no longer limited to a small TPM chip, cryptographic processes may be much more efficiently executed and/or made more complex. Also, since the protected area is no longer physical coupled to the client, if the client is destroyed, the keys that were constructed using data from the protected area may still be used.

Figure 4:
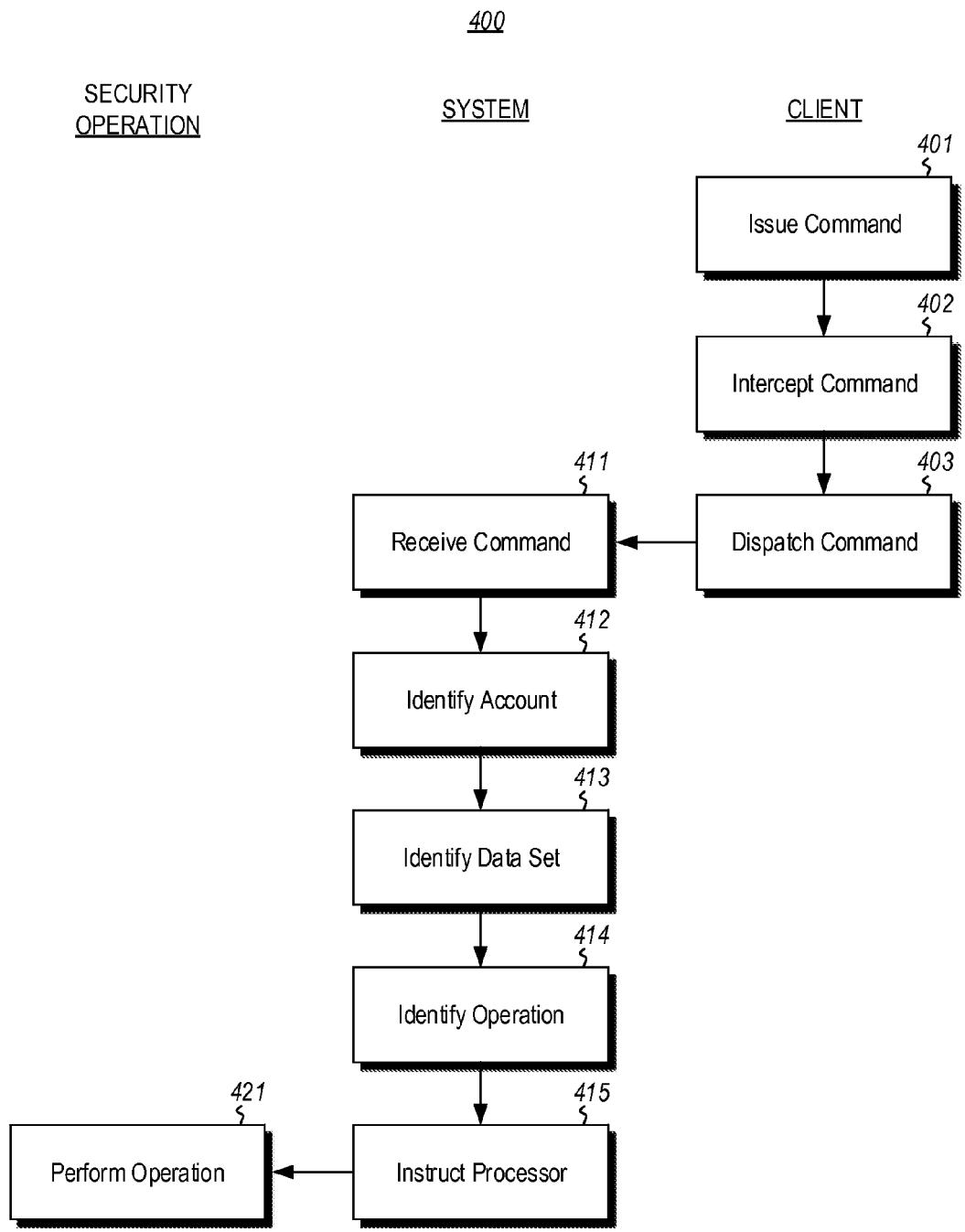
FIG. 4 illustrates a flowchart of a method for managing a trusted execution environment command.

Before further aspects are described, a general processing flow associated with the processing of a trusted execution environment command will be further described herein. In particular, FIG. 4 illustrates a flowchart of a method 400 for processing a trusted execution environment command. As an example, the trusted execution environment command may be any TPM command, whether conforming to any existing protocol (such as TPM version 1.2 and TPM version 2.0) or whether conforming to a future TPM protocol or any protocol that facilitates communication with a local trusted execution environment layer. Some of the acts of the method 400 are performed by the client (e.g., client 201A) as illustrated in the right column of FIG. 4 under the header "CLIENT". Others of the acts are performed by the system 210 as illustrated in the middle column of FIG. 4 under the header "SYSTEM". Other acts are performed by the security processor 213 as illustrated in the left column of FIG. 4 under the header "SECURITY OPERATION".

The process begins when the client issues a trusted execution environment command (act 401). Rather, or in addition to, being dispatched to a local TPM on the client, the trusted execution environment comment is intercepted (act 402), and dispatched to the system (act 403).

The system then receives the trusted execution environment command (act 411), identifies an account associated with the client that issued the trusted execution environment command (act 412), identifies a data set associated with the client (act 413), and identifies the operation to be performed (act 414). The security processor is then instructed to perform the operation (act 415), and the security processor then performs the operation (act 421) on the identified data set of the identified account.

One of the functions of a TPM not yet mentioned relies on the ability to detect a power cycle of the corresponding client. This is one of the reasons why the TPM is bound within the corresponding client, and hardwired to the power supplies of the client, so that the TPM can detect a loss of power, and a recovery of power. One of the reasons for detecting a power cycle is so that the TPM can reset some of the data within the protected data upon experiencing a loss and recovery of power. In some cases, the reliability of some of the machine-specific data within the TPM relies on knowing about power cycles.

One example of data that should be reset upon a power cycle is a platform event log. In a typical TPM, the event log is represented as a single entry. Whenever a new event of interest occurs (e.g., a loading of a piece of software, or a start of execution of a piece of software), that event is concatenated with the previous entry, hashed, and then stored as a new value of the entry. If this is done in a manner that the information (i.e., the previous events) from the old entry is preserved, then the entry can be mathematically evaluated to play back the sequence of events that have occurred in the platform. From this, platform integrity can be proved.

However, since the system 210 is not physically bound to any of the clients 201, but instead communicates over a network, it is difficult for the system 210 to determine whether any of the respective clients 201 have experienced a power cycle. Nevertheless, if the client does have a TPM, that TPM might track just enough information to be able to infer that a power cycle has occurred. This is possible even if the local client TPM is not fully functioning given that the trusted execution environment commands may not be given to the local TPM, but rather are intercepted and dispatched to the system 210. For instance, in FIG. 2, client 201A is illustrated as including TPM 202A, client 201B is illustrated as including TPM 202B, and client 201E is illustrated as including TPM 202E.

In this case, the account management module 212 and/or the system 210 as a whole may detect that a given client has been rebooted by communicating with the local client TPM installed in that client (e.g., communicating with TPM 202A in the case of client 201A). For instance, the system 210 may receive a cryptographic statement from the client 201A indicating that a power cycle has occurred. There are a number of ways that this might happen.

In a first example, the system 210 and local client TPM may communicate so that the system 210 receives PCR values associated with registers that would be reset upon a power cycle. The system 210 then compares the current value of the PCR in the protected data at the system with the value of the PCR in the local client TPM, and can infer whether a power cycle has occurred.

In a second example, local client TPM may establish an ephemeral key upon every power up of the client, and then negotiate with the client processor the use of this ephemeral key in order to communicate. The system 210 has awareness of this ephemeral key since it is tracking communications. If the system 210 detects that it is no longer able to understand the communications, then the ephemeral key must have changed, implying that the client has experienced a power cycle.

In an alternative embodiment, a power cycle of the system 210 may be detected even without a TPM on the system 210. For instance, this could be accomplished by having a system monitor which is capable of monitoring power cycling of client systems. A non-limiting example of such a system monitor is the MICROSOFT® System Center Virtual Machine Monitor (or SCVMM).

The system 210 may add protected data sets to a given account whenever a new client is added to the account. For instance, when a communication is detected associated with a particular account, and that communication somehow indicates that this is from an unrecognized client, then a new data set may be added to that account. Thus, for instance, assuming the client uses an encryption key to communicate with the system, if a communication arrives that uses an unrecognized encryption key, then perhaps a new client has been added. Likewise, a protected data set for an account may be deleted after a corresponding client is no longer operating on the account. For instance, there may be a garbage collection action in which protected data sets that have not been used for some period of time (perhaps years) are deleted from the account.

A policy module 214 may serve to allow actions by a client depending on whether criteria have been satisfied with respect to one or more data fields of the protected data set corresponding to the client. Alternatively or in addition, the policy module 214 may serve to allow actions by any client associated with an account depending on whether criteria have been satisfied with respect to one or more data fields of the account-level data sets. Combined with the fact that the memory associated with a protected data set could be significantly augmented as compared to a local TPM, this enables significant possibilities.

For instance, suppose that the protected data set for a given client includes an entire image of a restore state of the client (e.g., the operating system, any standard applications, standard configuration settings, and so forth). If that client has been lost or damaged, another client on the account may access the image and install the image on the new client provided that certain policy is met, such policy intended to be protected against improperly obtaining the restore state of the client.

The system 210 may also include a certificate management module 215 that uses a non-migratable key (e.g., a key that cannot be used outside of an account) to generate a certificate that is specific to that account, and that may thus be used by any of the clients associated with the account. Thus, each client does not need to create its own certificate in order to engage in certificate based authentication.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At a computer system comprising at least one processor, a computer-implemented method for emulating a physically attached trusted execution environment, the method comprising:
receiving trusted execution environment commands issued by a plurality of entities over a network, each trusted execution environment command being a command to operate on a security context that corresponds to an entity that issued the command;
performing, at a security processor instance, a plurality of cryptographic and security processes on keys and protected data sets in response to the received trusted execution environment commands, the security processor instance being tied to a particular entity and the particular entity's corresponding protected data sets, the security processor instance being prevented from processing execution environment commands from other entities; and
maintaining a plurality of protected accounts, wherein a particular protected account of the plurality of accounts comprises a protected data set that corresponds to the particular entity assigned to the particular account and that includes a plurality of keys corresponding to the particular entity, the protected data set not being readable outside of the system, the security processor instance using at least some of the plurality of keys to perform cryptographic processes in response to one or more trusted execution environment commands received from the particular entity.

2. The method of claim 1, wherein the trusted execution environment commands conform to a Trusted Platform Module (TPM) communication protocol.

3. The method of claim 1, wherein the protected data set includes at least a portion that is non-readable except by the security processor.

4. The method of claim 1, further comprising adding a new protected data set to the plurality of data sets when a new entity is added to the account.

5. The method of claim 1, further comprising removing a protected data set from the plurality of data sets after a corresponding entity is no longer operating.

6. The method of claim 1, wherein the plurality of keys includes an endorsement key.

7. The method of claim 1, wherein the protected data set further comprises a monotonic counter.

8. The method of claim 1, further comprising allowing actions by the particular entity dependent on whether policy is satisfied with respect to the data set.

9. The method of claim 1, wherein the particular entity is a particular device or system.

10. The method of claim 9, further comprising detecting that the particular device or system has been rebooted and, in response, resetting a portion of the protected data set.

11. The method of claim 9, further comprising detecting that the particular device or system has been rebooted using a cryptographic statement received from the particular entity.

12. The method of claim 10, wherein the reset portion comprises a platform event log register corresponding to the particular entity.

13. The method of claim 1, the particular account including a plurality of data sets each corresponding to an entity associated with the particular account, the particular data set being a first data set, the particular entity being a first entity, and the plurality of keys being a first plurality of keys, the particular account further comprising:
a second protected data corresponding to a second entity assigned to the particular account and that includes a second plurality of keys corresponding to the second entity, the second protected data set not being readable outside of the system, the security processor using at least some of the second plurality of keys to perform cryptographic processes in response to one or more trusted execution environment commands received from the second entity.

14. The method of claim 13, further comprising implementing a non-migratable key that is non-migratable from the particular account to generate a certificate that may be used by any of the plurality of entities associated with the account.

15. The method of claim 13, the particular account further comprising an account-level data set that is not specific to any of the entities associated with the account, but is general to the account itself.

16. The method of claim 15, the account-level data set immutably storing events associated with an account.

17. The method of claim 15, further comprising:
allowing actions by any of the plurality of entities associated with the account dependent on whether policy is satisfied with respect to the account-level data set.

18. At a computer system comprising at least security processor, a computer-implemented method comprising:
maintaining a plurality of protected accounts, wherein a particular protected account of the plurality of accounts comprises a protected data set that corresponds to a particular entity assigned to the particular account and that includes a plurality of keys corresponding to the particular entity, the protected data set not being readable outside of the particular account; and
using, by the security processor, at least some of the plurality of keys and protected data sets to perform cryptographic and security processes in response to one or more trusted execution environment commands received from the particular entity.

19. The method in accordance with claim 18, wherein the security processor performs a plurality of cryptographic and security processes on keys in response to the trusted execution environment commands issued by a plurality of entities over a network, each trusted execution environment command being a command to operate on a security context that corresponds to an entity that issued the command.

20. At a computer system comprising at least one processor, a computer-implemented method for emulating a physically attached trusted execution environment, the method comprising:
receiving trusted execution environment commands issued by a plurality of entities over a network, each trusted execution environment command being a command to operate on a security context that corresponds to an entity that issued the command, and each trusted execution environment command conform to a Trusted Platform Module (TPM) communication protocol;
performing, at a security processor instance, a plurality of cryptographic and security processes on keys and protected data sets in response to the trusted execution environment commands received by the reception module; and maintaining a plurality of protected accounts, wherein a particular protected account of the plurality of accounts comprises a plurality of data sets comprising:
- a first protected data set that corresponds to a first entity assigned to the particular account and that includes a first plurality of keys corresponding to the first entity, and
- a second protected data set that corresponds to a second entity assigned to the particular account and that includes a second plurality of keys corresponding to the second entity, the plurality of protected data sets not being readable outside of the system, the security processor instance using at least some of the plurality of keys for a given protected data set to perform cryptographic processes in response to one or more trusted execution environment commands received from an entity corresponding to the given protected data set.

21. A computer system comprising:
at least one processor; and
one or more storage device having stored computer-executable instructions which are executable by the at least one processor to cause the computing system to emulate a physically attached trusted execution environment by:
- receiving trusted execution environment commands issued by a plurality of entities over a network, each trusted execution environment command being a command to operate on a security context that corresponds to an entity that issued the command;
- performing, at a security processor instance, a plurality of cryptographic and security processes on keys and protected data sets in response to the received trusted execution environment commands, the security processor instance being tied to a particular entity and the particular entity's corresponding protected data sets, the security processor instance being prevented from processing execution environment commands from other entities; and
- maintaining a plurality of protected accounts, wherein a particular protected account of the plurality of accounts comprises a protected data set that corresponds to the particular entity assigned to the particular account and that includes a plurality of keys corresponding to the particular entity, the protected data set not being readable outside of the system, the security processor instance using at least some of the plurality of keys to perform cryptographic processes in response to one or more trusted execution environment commands received from the particular entity.

22. A computer system comprising:
one or more storage device maintaining a plurality of protected accounts, wherein a particular protected account of the plurality of accounts comprises a protected data set that corresponds to a particular entity assigned to the particular account and that includes a plurality of keys corresponding to the particular entity, the protected data set not being readable outside of the particular account; and
a security processor which utilizes at least some of the plurality of keys and protected data sets to perform cryptographic and security processes in response to one or more trusted execution environment commands received from the particular entity.

\* \* \* \* \*